United States Patent
Chen et al.

(10) Patent No.: US 10,397,096 B2
(45) Date of Patent: Aug. 27, 2019

(54) PATH RESOLUTION IN INFINIBAND AND ROCE NETWORKS

(71) Applicant: International Business Machines Corporation, Armonk, NY (US)

(72) Inventors: Lior Chen, Jerusalem (IL); Constantine Gavrilov, Rishon LeZion (IL); Alexander Snast, Rishon LeZion (IL); Ari Zigler, Elkana (IL)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 15/581,264

(22) Filed: Apr. 28, 2017

(65) Prior Publication Data
US 2018/0316602 A1    Nov. 1, 2018

(51) Int. Cl.
*H04L 12/56* (2006.01)
*H04L 12/707* (2013.01)
(Continued)

(52) U.S. Cl.
CPC .............. *H04L 45/22* (2013.01); *H04L 45/18* (2013.01); *H04L 45/42* (2013.01); *H04L 45/742* (2013.01); *H04L 49/358* (2013.01); *H04L 69/162* (2013.01); *H04L 12/56* (2013.01); *H04L 67/1097* (2013.01); *H04L 69/40* (2013.01)

(58) Field of Classification Search
CPC ....... H04L 12/56; H04L 49/358; H04L 45/42; H04L 69/40; H04L 69/162
See application file for complete search history.

(56) References Cited

U.S. PATENT DOCUMENTS

| 5,604,843 A | 2/1997 | Shaw et al. |
| 6,263,360 B1 | 7/2001 | Arnold et al. |

(Continued)

OTHER PUBLICATIONS

List of IBM Patents or Patent Applications Treated as Related, May 12, 2017, 2 pages.

(Continued)

*Primary Examiner* — Kyung H Shin
(74) *Attorney, Agent, or Firm* — Stephen R. Tkacs; Stephen J. Walder, Jr.; Robert M. Sullivan (57) ABSTRACT

A mechanism is provided in a data processing system comprising at least one processor and at least one memory, the at least one memory comprising instructions that are executed by the at least one processor and configure the at least one processor to implement a path query cache. Responsive to receiving a path query from a process executing in the data processing system, the path query cache performs a lookup of the path query in the path query cache. The path query identifies a source port, a source address and a destination address. The path query cache stores a plurality of entries, each entry comprising a source port, a source address, a destination address, the source and destination global identifiers, and good/bad flag indicating whether a path associated with the entry is available or not. Responsive to the path query cache determining the path query matches a valid entry in the plurality of entries, the path query cache returns a result to the process. The result comprises the source and destination global identifiers and the good/bad flag from the valid entry.

20 Claims, 5 Drawing Sheets (51) Int. Cl.
_H04L 12/747_ (2013.01)
_H04L 12/931_ (2013.01)
_H04L 12/705_ (2013.01)
_H04L 12/717_ (2013.01)
_H04L 29/06_ (2006.01)
_H04L 29/08_ (2006.01)
_H04L 12/54_ (2013.01)
_H04L 29/14_ (2006.01)

(56) References Cited

U.S. PATENT DOCUMENTS

| | | |
|---|---|---|
| 6,704,806 B1 | 3/2004 | Decker |
| 7,103,626 B1 | 9/2006 | Recio et al. |
| 7,103,888 B1 | 9/2006 | Cayton et al. |
| 7,685,254 B2 | 3/2010 | Pandya |
| 69,431,262 | 4/2010 | Rivard et al. |
| 7,953,854 B2 | 5/2011 | Elnozahy et al. |
| 8,122,120 B1 | 2/2012 | Athreya et al. |
| 27,166,962 | 9/2012 | Bestler |
| 8,601,250 B2 | 12/2013 | Kochar et al. |
| 8,681,606 B2 | 3/2014 | Gavrilov et al. |
| 8,780,913 B2 | 7/2014 | Gavrilov et al. |
| 8,893,013 B1 | 11/2014 | Groves et al. |
| 8,959,171 B2 | 2/2015 | Chadalapaka |
| 9,047,178 B2 | 6/2015 | Talagala et al. |
| 9,389,976 B2 | 7/2016 | Doshi et al. |
| 2002/0087778 A1 | 7/2002 | Schoinas |
| 2003/0043757 A1 | 3/2003 | White |
| 2005/0278724 A1 | 12/2005 | Buskens et al. |
| 2007/0002838 A1 | 1/2007 | Komura |
| 2007/0282967 A1 | 12/2007 | Fineberg et al. |
| 2008/0163176 A1 | 7/2008 | Krauss |
| 2009/0307378 A1 | 12/2009 | Allen et al. |
| 2012/0099585 A1* | 4/2012 | Yamamoto ............ H04L 45/42 370/389 |
| 2012/0102504 A1 | 4/2012 | Iyer et al. |
| 2012/0221803 A1 | 8/2012 | Stabrawa et al. |
| 2013/0051394 A1* | 2/2013 | Gavrilov ............ H04L 12/56 370/392 |
| 2013/0185428 A1* | 7/2013 | Houghton ............ H04L 69/40 709/225 |
| 2014/0177639 A1 | 6/2014 | Vershkov et al. |
| 2015/0089303 A1 | 3/2015 | Cardona et al. |
| 2015/0264116 A1 | 9/2015 | Weiny et al. |
| 2015/0281126 A1 | 10/2015 | Regula et al. |
| 2016/0041906 A1 | 2/2016 | Mukherjee et al. |
| 2016/0127495 A1 | 5/2016 | Tasoulas et al. |
| 2016/0179640 A1 | 6/2016 | Murata |

OTHER PUBLICATIONS

Behrens, Jonathan et al., "Pushing Bytes: Cloud Scale Big-Data Replication with RDMC", Cornell University, Department of Computer Science, http://www.cs.cornell.edu/projects/quicksilver/public_pdfs/socc2016-paper17.pdf, (month unknown), 2016, 13 pages.

Merkin, C. M., "Method to Bound Peripheral Component Interconnect System Configurations", IBM Technical Disclosure Bulletin, vol. 37, No. 10, Abstract Only, Oct. 1, 1994, 2 pages.

Poke, Marius et al., "DARE: High-Performance State Machine Replication on RDMA Networks", ACM, Proceedings of the 24th International Symposium on High-Performance Parallel and Distributed Computing, HPDC'15, Portland, Oregon, Jun. 15-19, 2015, pp. 107-118.

Tasoulas, Evangelos et al., "A Novel Query Caching Scheme for Dynamic InfiniBand Subnets", IEEE, 2015 15th IEEE/ACM International Symposium on Cluster, Cloud and Grid Computing, May 4, 2015, pp. 199-210.

Wei, Xingda et al., "Fast In-memory Transaction Processing using RDMA and HTM", ACM, SOSP'15, Monterey, California, Oct. 4-7, 2015, pp. 87-104.

* cited by examiner

PATH RESOLUTION IN INFINIBAND AND ROCE NETWORKS

BACKGROUND

The present application relates generally to an improved data processing apparatus and method and more specifically to mechanisms for path resolution in InfiniBand networks.

InfiniBand™ is an industry-standard specification that defines an input/output architecture used to interconnect servers, communications infrastructure equipment, storage and embedded systems. A true fabric architecture, InfiniBand (IB) leverages switched, point-to-point channels with data transfers that generally lead the industry, both in chassis backplane applications as well as through external copper and optical fiber connections. Reliable messaging (send/receive) and memory manipulation semantics (remote direct memory access (RDMA)) without software intervention in the data movement path ensure the lowest latency and highest application performance.

This low-latency, high-bandwidth interconnect requires only minimal processing overhead and is ideal to carry multiple traffic types (clustering, communications, storage, management) over a single connection. As a mature and field-proven technology, InfiniBand is used in thousands of data centers, high-performance compute clusters and embedded applications that scale from two nodes up to clusters utilizing thousands of nodes. Through the availability of long reach InfiniBand over Metro and wide area network (WAN) technologies, InfiniBand is able to efficiently move large data between data centers across the campus to around the globe.

ROCE stands for RDMA over converged Ethernet and allows to use Infiniband APIs and transports over Ethernet physical layer. Applications written for Infiniband can be deployed on Ethernet using ROCE with little or no software changes.

A subnetwork, commonly referred to as a subnet, is a logical subdivision of a Layer-3 network. Network ports of nodes within a given subnet share the same Layer-3 network address prefix. For example, in Internet Protocol (IP) networks, the ports in each subnet share the same most-significant bit-group in their IP address, so that the IP address is logically divided into two fields: a network or routing prefix, and the rest field or host identifier. Similarly, in InfiniBand™ (IB) networks, each subnet is uniquely identified with a subnet identifier known as the Subnet Prefix. For each port in the subnet, this prefix is combined with a respective Port Identifier to give the IB Layer-3 address of the port, known as the Global Identifier (GID). Each port has at least one GID in each network, which is Subnet Prefix plus Globally Unique Port Identifier (GUID) assigned by manufacturer. Non-default port identifiers that are software defined are also possible. ROCE networks also maintain the notion of IB networks and sub-networks, since they deploy Infiniband protocols. The Subnet Prefix is present, while the default port address (GUID) is obtained from Media Access Control (MAC) address using standard translation. Software defined GIDs based on software defined MAC addresses or IP addresses are also possible.

Typically, the logical subdivision of a Layer-3 network into subnets reflects the underlying physical division of the network into Layer-2 local area networks. The subnets are connected to one another by routers, which forward packets on the basis of their Layer-3 (IP or GID) destination addresses, while within a given subnet; packets are forwarded among ports by Layer-2 switches or bridges. These Layer-2 devices operate in accordance with the applicable Layer-2 protocol and forward packets within the subnet according to the Layer-2 destination address, such as the Ethernet™ medium access control (MAC) address or the IB link-layer Local Identifier (LID). In general, Layer-2 addresses in a given subnet are recognized only within that subnet, and routers will swap the Layer-2 address information of packets that they forward from one subnet to another.

In IB networks, a Subnet Manager (SM) in each subnet assigns a LID to each physical port of each host within the given subnet. A subnet administration (SA) function provides nodes with information gathered by the SM, including communication of the LID information to a Subnet Management Agent (SMA) in each node of the subnet. For simplicity and clarity in the description that follows, all of these subnet management and administration functions will be assumed to be carried out by the SM. Layer-2 switches within the subnet are configured by the SM to forward packets among the ports on the basis of the destination LID (D-LID) in the packet header. The SM is typically implemented as a software process running on a suitable computing platform in one of the nodes in the subnet, such as a host computer, switch or appliance.

ROCE transports deployed Ethernet maintain compatibility with Infiniband physical transports by using GID addresses. The GID addresses remain Layer-3 addresses, while Layer-2 used by switches to route packets from source to destination are MAC addresses of Ethernet ports. The MAC addresses can be assigned in hardware (default globally unique MAC address) or be assigned by software. Each port can use more than one MAC address.

DMA can also be used for "memory to memory" copying or moving of data within memory. Either source or destination memory can be IO memory that belongs to a hardware device (for example PCI IO memory). DMA can offload expensive memory operations, such as large copies or scatter-gather operations, from the CPU to a dedicated DMA engine. An implementation example is the I/O Acceleration Technology. Without DMA, when the CPU is using programmed input/output, it is typically fully occupied for the entire duration of the read or write operation, and is thus unavailable to perform other work. With DMA, the DMA master first initiates the transfer and then does other operations while the transfer is in progress, and it finally receives notification from the DMA slave when the operation is done. IO accelerators typically have dedicated DMA master engines, which allow the hardware to copy data without loading the CPU.

Technically, with Interconnect it is not the application code that requests DMA, but the adapter logic (when doing sends it requests DMA from system memory and when doing receives it requests DMA to system memory). On modern systems, the memory controller and DMA slave are part of CPU, so only in then sense the CPU is involved. However, this is a much smaller overhead compared to copying data on CPU, and this does not preempt computational work on CPU. There is no CPU interrupt here since CPU is not master but slave. The Interconnect hardware (IB adapter) knows when transfer has completed.

This feature is useful at any time that the CPU cannot keep up with the rate of data transfer, or when the CPU needs to perform useful work while waiting for a relatively slow I/O data transfer. Many hardware systems use DMA, including disk drive controllers, graphics cards, network cards and sound cards. DMA is also used for intra-chip data transfer in multi-core processors. Computers that have DMA channels can transfer data to and from devices with much less CPU overhead than computers without DMA channels. Similarly, a processing element inside a multi-core processor can transfer data to and from its local memory without occupying its processor time, allowing computation and data transfer to proceed in parallel.

Remote direct memory access (RDMA) is a direct memory access from the memory of one computer into that of another without involving either one's operating system. This permits high-throughput, low-latency networking, which is especially useful in massively parallel computer clusters. RDMA supports zero-copy networking by enabling the network adapter to transfer data directly to or from application memory of a remote application, eliminating the need to copy data between application memory and the data buffers in the operating systems of source and destination. Such transfers require no intensive work to be done by CPUs, or context switches, and transfers continue in parallel with other system operations (both on local and remote nodes). When an application performs an RDMA Read or Write request, the application data is delivered directly to the network, reducing latency and enabling fast message transfer. However, this strategy presents several problems related to the fact that the target node is not notified of the completion of the request (single-sided communications).

RDMA capable applications exchange messages via objects called queue pairs (QPs). Each QP comprises a send queue and a receive queue, and in order to exchange messages, the local and remote QPs must connect to each other. The process of connection establishment involves sending and receiving connection management (CM) management datagrams (MADs) and is covered by the Infiniband™ specification. A path specification is a part of CM payload, and a CM request cannot be sent before the path is known. The path includes source and destination layer-2 and layer-3 addresses. When an application wants to connect, it is typically aware of remote application by its address assigned by software (IP address or LID or MAC address). To send a CM request, global identifiers (GIDs) need to be resolved from software addresses. This process is called path resolution.

Applications can use RDMA technology only after they have established reliable connections, and establishing a reliable connection requires path resolution to complete. Modern RDMA adapters are powerful, and it is not possible to utilize their power without use of multiple hardware event queues and multiple application threads. For example, a dual-port 100 Gbit adapter can process 6 million sends and 6 million receives per second (using message sizes of 4 KB). Such adapters that have at least 100 event queues and commodity servers with that many CPUs are widely available. One of the scalable approaches to utilize Interconnect and CPU performance is to use a multi-domain approach, where each application thread opens its own device context and binds to its own device event queue. Each thread can pin to a given CPU and pin event queue to receive interrupts on the same CPU. This approach minimizes context switches, cross-CPU communication, and cross-CPU locks, allowing maximization of system performance. At the same time, it requires each application thread to establish connections of its own. This multiplies the number of connections and the number of path queries in the system and requires optimizations in both path queries and connection establishment.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions that are executed by the at least one processor and configure the at least one processor to implement a path query cache. The method comprises, responsive to receiving a path query from a process executing in the data processing system, performing a lookup of the path query in the path query cache. The path query identifies a source port and a destination address. The path query cache stores a plurality of entries, each entry comprising a source port, source address, destination address, source and destination global identifiers, and good/bad flag indicating whether a path associated with the entry is a good path or a bad path. The method further comprises, responsive to the path query cache determining the path query matches a valid entry in the plurality of entries, returning a result to the process. The result comprises the source address, destination address, source and destination global identifiers and the good/bad flag from the valid entry.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for optimizing path query lookups in InfiniBand networks. The illustrative embodiments provide a path query cache that decreases the amount of discoveries necessary and decreases latency for path lookups.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
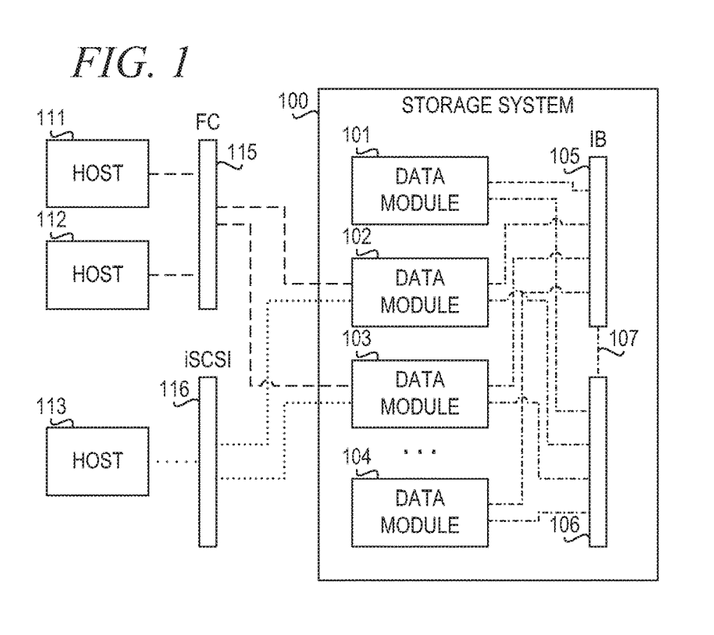
FIG. 1 depicts a pictorial representation of an example storage system in which aspects of the illustrative embodiments may be implemented.
Figure 2:
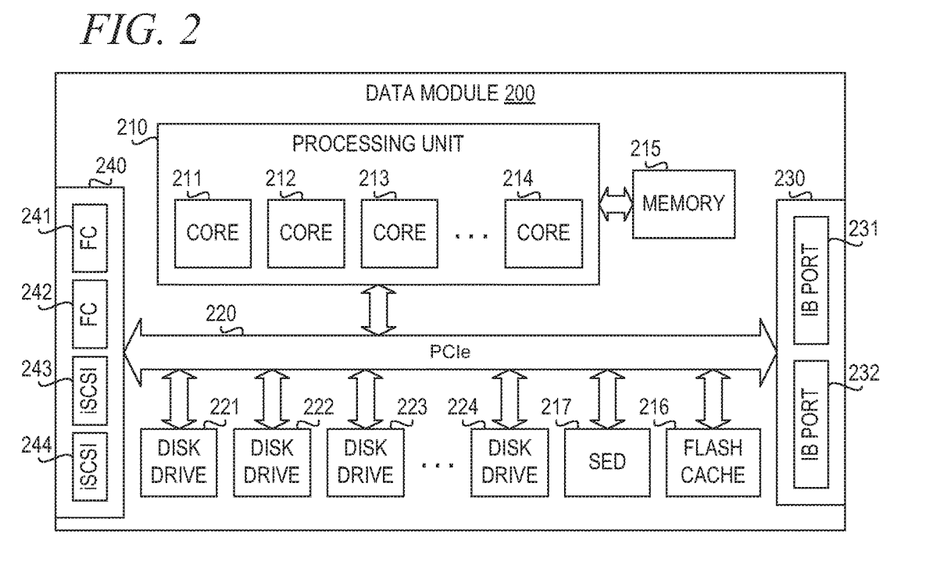
FIG. 2 is a block diagram of an example data module in which aspects of the illustrative embodiments may be implemented.
Figure 3:
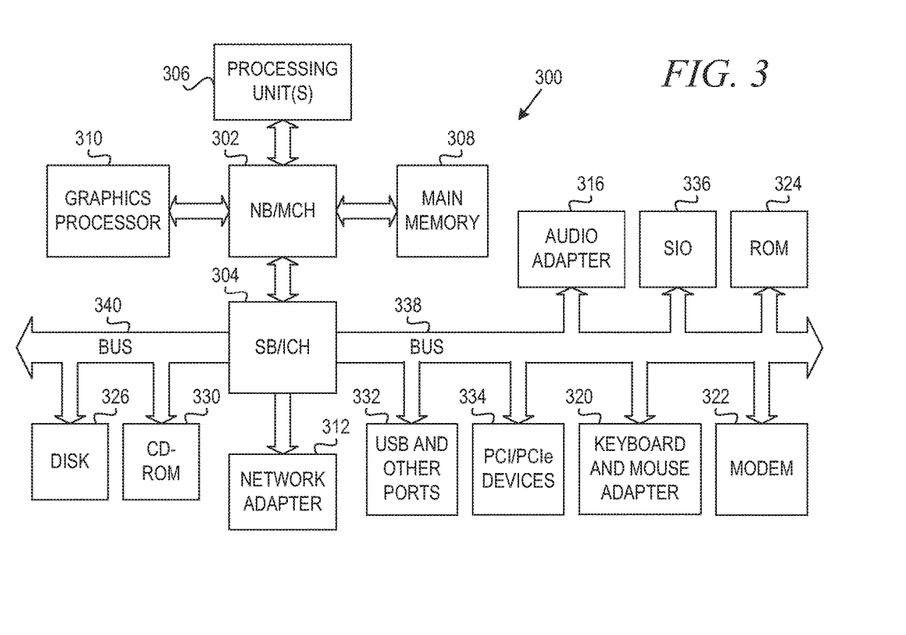
FIG. 3 is a block diagram of just one example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example storage system in which aspects of the illustrative embodiments may be implemented. In the depicted example, hosts 111, 112 connect to storage system 100 via Fibre Channel (FC) switch 115, and host 113 connects to storage system 100 via Internet small computer systems interface (iSCSI) switch 116. Storage system 100 is a scalable enterprise storage system that is based on a grid array of hardware components. Storage system 100 can attach to both Fibre Channel Protocol (FCP) and Internet Protocol (IP) network iSCSI capable hosts 111-113. Storage system 100 supports a wide range of enterprise features, including hardware redundancy, synchronous and asynchronous mirroring, thin provisioning, data migration, quality of service controls, support for virtualization platforms, differential snapshots, compression, encryption, etc.

Storage system 100 has a variable number of data modules 101-104 (e.g., 6, 9, 12, or 15 modules). Data modules 101-104 communicate with each other via an InfiniBand (IB) network, facilitated by two IB switches 105, 106 connected via inter-module connectivity 107. Each data module 101-104 can serve as a cache driving backend IO and cache coherency. A limited number of data modules—in the depicted example, data modules 102, 103—can serve as interfaces, providing FCP or iSCSI connectivity to hosts 111-113.

Storage system 100 may distribute data across all backend storage equally, so that each created volume is striped across all backend disks. In one example embodiment, two copies of each volume slice may be used, stored on different modules. Each volume slice has a designated primary and secondary cache. For reads, the data is fetched by an interface data module (e.g., data module 102) from the relevant primary cache module (e.g., data module 104). Reading a volume slice will cache it. For writes, an interface data module (e.g., data module 103) sends data to primary cache and the primary cache replicates data to the secondary cache (e.g., data module 101). The completion of the write is returned when two copies of data are stored in memory of two different modules (e.g., data modules 101, 103). Actual writing of data to backend storage or eviction to solid state drive (SSD) caches is done in the background according to cache management algorithms.

In an alternative embodiment, each volume uses three copies: one primary copy and two secondary copies. Read IOs fetch relevant data from the primary cache node and from the backend if not found in cache. The write IOs send data to primary cache, and the primary cache replicates the data to the secondary caches. The writes are completed after three copies of data are stored in memory of three different caches. This allows simultaneous loss of two data modules without data loss. At the same time, rebuilds are significantly faster and require only synchronizing caches or cache destages.

As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the data modules 101-104 and/or hosts 111-113 may be specifically configured to implement a mechanism for path resolution. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as data module 101 or host 111, for causing one or more hardware processors of the computing device to execute the software applications that configure the processors to perform the operations and generate the outputs described herein with regard to the illustrative embodiments. Moreover, any combination of application specific hardware, firmware, and software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates path resolution.

FIG. 2 is a block diagram of an example data module in which aspects of the illustrative embodiments may be implemented. Data module 200 comprises processing unit 210, which has a plurality of processing cores 201-204, and memory 211. Processing unit 210 connects to peripheral component interconnect express (PCIe) bus 220, through which processing unit 210 communicates with flash cache 212, self-encrypting drive 213, disk drives 221-223, Infini-Band (IB) adapter 230, and IO adapter 240. In the depicted example, IB adapter 230 has two IB ports 231, 232, and IO adapter 240 has two Fibre Channel (FC) ports 241, 242 and two Internet small computer systems internet (iSCSI) ports 243, 244.

Instructions for the operating system, the object-oriented programming system, and applications or programs are located on storage devices, such as disk drive 221, and may be loaded into memory 215 for execution by processing unit 210. The processes for illustrative embodiments of the present invention may be performed by processing unit 210 using computer usable program code, which may be located in a memory such as, for example, memory 215. As such, the data module shown in FIG. 2 becomes specifically configured to implement the mechanisms of the illustrative embodiments and specifically configured to perform the operations and generate the outputs described hereafter with regard to path resolution.

FIG. 3 is a block diagram of just one example data processing system in which aspects of the illustrative embodiments may be implemented. Data processing system 300 is an example of a computer, such as host 111 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 300.

As a server, data processing system 300 may be, for example, an IBM eServer™ System p® computer system, Power™ processor based computer system, or the like, running the Advanced Interactive Executive (AIX®) operating system or the LINUX® operating system. Data processing system 300 may be a symmetric multiprocessor system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

As mentioned above, in some illustrative embodiments the mechanisms of the illustrative embodiments may be implemented as application specific hardware, firmware, or the like, application software stored in a storage device, such as HDD 326 and loaded into memory, such as main memory 308, for executed by one or more hardware processors, such as processing unit 306, or the like. As such, the computing device shown in FIG. 3 becomes specifically configured to implement the mechanisms of the illustrative embodiments and specifically configured to perform the operations and generate the outputs described hereafter with regard to path resolution.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system, other than the symmetric multiprocessor system mentioned previously, without departing from the spirit and scope of the present invention.

In accordance with an illustrative embodiment, the storage system supports multi-domain interconnect. IO services (cache node, compression node, interface node, gateway node) work with multiple worker threads, called "domains." Each domain makes an effort of working with its own objects to minimize locking and inter-thread communication. In some implementations, single node-to-node connections are established per service level, and all domains share the same connections. In accordance with the illustrative embodiment, each domain has a private Interconnect context and private connections to other nodes. This has the following benefits:

No locking on interconnect objects that is very prohibitive for high IO on non-uniform memory access (NUMA) systems;

Private send and receive queues for each domain that allow resource optimization and easy IO processing (post and completions) from domain context;

All connectivity and IO events (errors and notifications) are easily processed in the domain context.

Each node in the system has multiple Interconnect ports and load balances the traffic across plurality of source and destination ports. Each connection has a prioritized list of paths to use. For example, with dual switch system and dual port Interconnect, half of the application threads will have the following four paths:

path from source port-1 to destination port-1
path from source port-2 to destination port-2
path from source port-1 to destination port-2
path from source port-2 to destination port-1

The other half of the application threads will have the following four paths:

path from source port-2 to destination port-2
path from source port-1 to destination port-1
path from source port-2 to destination port-1
path from source port-1 to destination port-2

This priority selection follows the logic that port-2 on all nodes is connected to switch-1, that port-2 on all nodes is connected to switch-2, and that cross-switch communication is more expansive than communication via the same switch. At the same time, it allows the use of both ports on each node. Destination ports are identified by addresses assigned by software (for example LID or IP or MAC address).

Connection establishment in InfiniBand and ROCE networks requires knowing the path (a structure defined by InfiniBand standard). Quick path resolution allows quick connection establishment when multiple connection requests are made and allows to decrease down time (or service interruptions) when a system (or part of the system) is rebooted due to replacement or software upgrades.

Discovering the path comprises determining level-3 address (GID) from a software defined address. Each connection resolves paths in the order of priorities specified in its path list. If a first path is resolved, connection is established using the first path. Otherwise, the next path is tried. Resolving path requires sending subnet management protocol (SMP) or subnet administration (SA) management datagrams to destination or subnet manager. In the case of ROCE, SA management datagrams or CM ClassPortinfo datagram can be used. These datagrams are not reliable (i.e., they may be lost) but have inherently high service level (virtual lane guarantees).

To facilitate this high service level, all hardware components of InfiniBand networks have reserved queues for management datagrams (ROCE networks can implement service levels via VLAN channels). These queues will drive the hardware credits when sending and receiving the management datagrams. These queues, however, are not sufficiently large to support simultaneous delivery and reception of hundreds or thousands of packets. This is especially true for SMP datagrams on Infiniband networks, which are sent via direct route, because those may fault to slow software path, meaning switches do not implement it in ASIC (hardware) and it faults to software path, which has an even smaller queue depth.

In addition, the target side, which receives the datagram and is expected to send a reply, will have trouble handling thousands of messages at once. There are two approaches to handling the datagrams:

External (to firmware) agent. This assumes triggering interrupt on the target and satisfying request from an interrupt handler or notifying an application that is responsible for framing the reply from the interrupt handler. This has inherent scaling issues since such interrupt can happen on a single CPU and the work cannot be easily palatalized across multiple CPUs. Satisfying the queries requires calls to firmware to get address, global identifier (GID), and link parameters and is also considered a slow path. In addition, the number of pending commands to device is very limited and is often one (some advanced hardware supports thirty-two commands in parallel).

Internal (to firmware) agent. This is easier on the operating system but is often slower, since it is done using field programmable gate array (FPGA) and not application specific integrated circuit (ASIC) logic. Also, it is subject to the same resource limitations to the number of simultaneous firmware commands as the first approach. In addition, internal subnet manager agent (SMA) implements queues for management datagrams (MADs) that are much smaller than the sizes used by the driver in the first approach.

Another limitation is that receiving the answers to MAD queries has the same resource and latency limitations as sending. These resource constraints may lead to losses and significant timeouts (>=1 second) for path resolution queries if thousands of simultaneous requests are made. This leads to significant latencies in connection establishment. In addition, it is difficult to distinguish such timeouts from true unavailable paths, which may lead to selection of non-optimal paths in connections or cause higher latencies for path resolution.

There are two typical solutions to path query implementations: subnet manager repository (Central Cluster Repository) and direct communication with the destination.

Subnet manager repository is a more common solution in Infiniband networks that directs all path queries to a central entity in the network cluster called "subnet manager" (SM). Subnet manager does periodic sweeps of the network to discover its state and has a path picture for all nodes. An application that wishes to send a path query sends SA MAD to the SM, and the SM will answer the query using the last discovery information. This has a number of problems:

1. For each path query, an SA datagram is still needed. These datagrams are subject to all resource constraints described above.

2. An application needs to determine the location of the SM. This may require additional datagrams and is not reliable at boot (when election takes place). Typically, applications want to establish connectivity at boot time, which follows software upgrade or hardware replacement, while election still takes place. Thus, applications incur additional latencies if the SM is not yet available, or if the request is sent to a master instance that changed its role to standby while request reached it. This may increase service interruption time.

3. At boot time (a common case for connectivity establishment), the SM does not have a full picture of the network. This will result in higher latencies for path queries, until discovery of the network is complete. This may increase service interruption time when hardware replacement or software upgrades take place.

4. Leaving single node to handle all path queries for the whole cluster is inherent scaling issue.

5. With this approach, stale path data can be received. For example, if a remote port loses link and an error in the connection takes place, the local application may request a new connection before the SM has discovered the loss of the link. In this case, when the application requests the first path, it resolves as available when in fact it is not. Connections to non-existing destinations have high latency, and only when they return an error will the next path be tried.

Direct communication with the destination is another, less common approach. This approach determines the path by querying the destination directly using MAD packets, addressed to the destination. For example, SMP PortInfo or CM (Connection Management) Class PortInfo queries can be used. This has a number of benefits (compared to the previous approach):

1. No dependency on central SM;
2. No additional latency at boot time;
3. The scalability issue is avoided, because queries become distributed; and
4. The chance of getting a stale path is low.

This approach works well to minimize latencies if the number of connections is not large. However, with hundreds or thousands of connections, a penalty is paid for sending the same path queries from multiple application threads. The queries and replies are lost (or they time out) due to the reasons described above. Since it is difficult to distinguish MAD timeouts from unreachable destinations, path resolution needs to balance between high latencies or choosing non-primary paths, and may suffer from both issues. The multi-domain approach described above suffers from these limitations.

The illustrative embodiments provide a method for implementing a node (or process) path query cache. The path query cache minimizes the number of requests, decreases latency finding a good path, and decreases the latency determining a path is bad.

Figure 4:
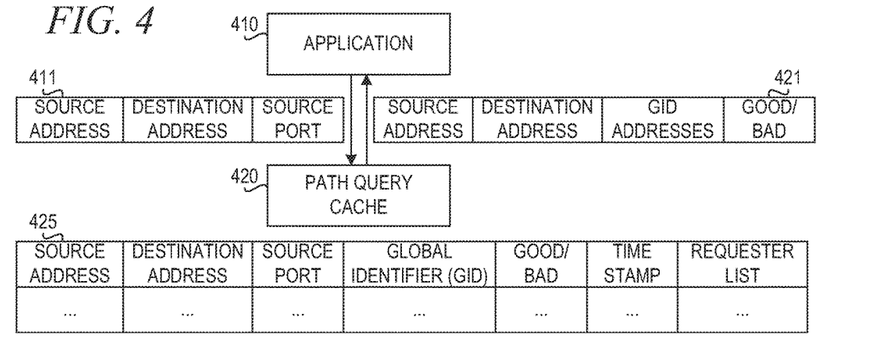
FIG. 4 is a block diagram illustrating a path query cache in accordance with an illustrative embodiment.

FIG. 4 is a block diagram illustrating a path query cache in accordance with an illustrative embodiment. Application 410 sends a path query 411 to path query cache 420. The path query 411 includes a source address, destination address, and source port. The typical input to the path query 411 is source port, which identifies local device and its port number, and destination address. The source address is optional and might be used for cases where multiple addresses can be configured on the source port. If the source address is not specified, then the path query result will return a default (primary) source address for the specified source port.

Path query cache 420 stores a plurality of entries 425. Each entry 425 in path query cache 420 includes source port, source address, destination address, global identifier (GID) for source and destination ports, a good/bad flag, a time stamp, and a requester list. Path query cache 420 performs a lookup operation to match the source address (if provided), destination address, and source port from path query 411 to the plurality of entries 425. The lookup operation is described in further detail below.

Path query cache 420 returns a response 421 to the application 410. The response 421 includes source and destination addresses, global identifiers for source and destination addresses, and a good/bad flag. Thus, the application receives GID addresses and an indication of whether the path is good or bad without sending the query to the destination.

Figure 5:
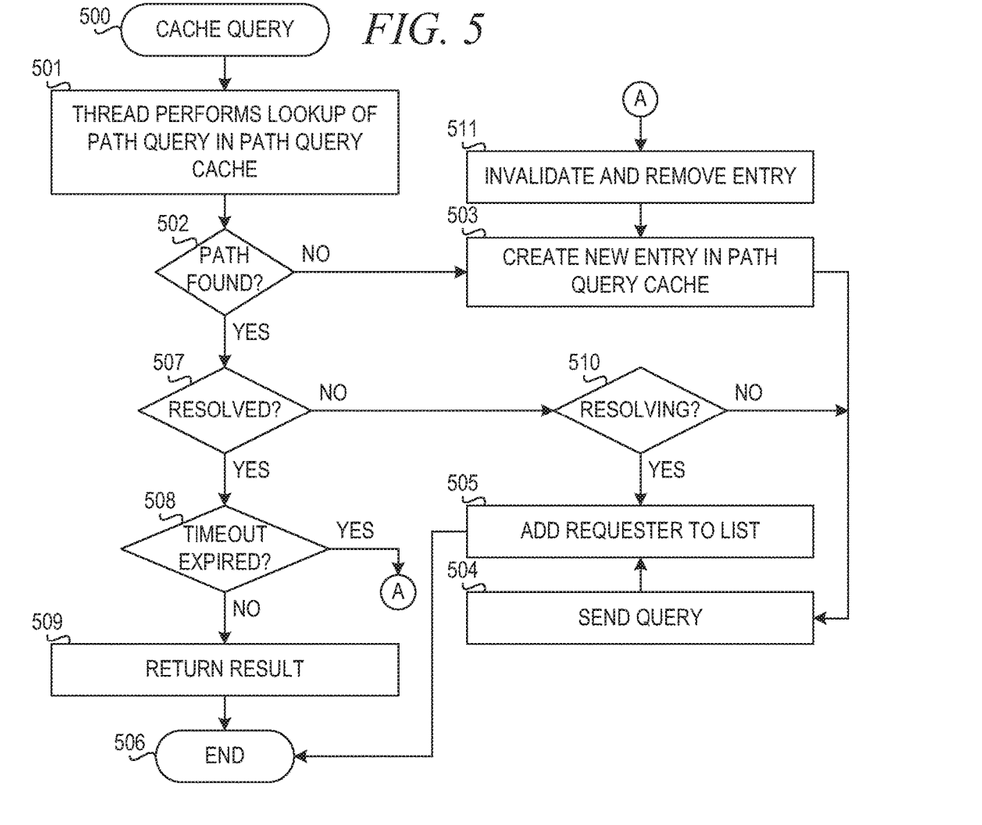
FIG. 5 is a flowchart illustrating operation of a path query cache receiving a path query in accordance with an illustrative embodiment.

FIG. 5 is a flowchart illustrating operation of a path query cache receiving a path query in accordance with an illustrative embodiment. Operation begins when a path query is received from a process (thread) (block 500), and the process performs a lookup of the path query in the path query cache based on information in the path query (block 501). If source address is not specified and used by the implementation, it is set to the primary address of the source port. The path query may include a destination address, a source port, and optionally a source address. The path query cache determines whether the path is found (block 502). If the path is not found, the path query cache creates a new entry in the path query cache (block 503). The path query cache sends the query to the destination (block 504) and adds the requesting process to the requester list (block 505). Thereafter, operation ends (block 506). The path query cache keeps a list of requesting processes while a path is still being resolved. The path query cache can then notify the requesters when the path is resolved.

If the path is found in block 502, the path query cache determines whether the path is resolved (block 507). The path query cache may determine that the path is resolved by looking at its status flag (good or bad or by examining whether requester list is empty). If the path is resolved, then the path query cache determines whether the cache life timeout expired (block 508). There may be different cache life values for path available and unavailable states. In accordance with one embodiment, the path query cache determines whether the cache life timeout expired based on a time stamp of the path entry representing a time that the path was resolved, a predetermined cache life value representing an amount of time a path entry may remain in the cache, and a current time. If the cache life timeout has not expired, then the path query cache returns the result to the requesting thread (block 509). Thereafter, operation ends (block 510).

If the path is not yet resolved in block 507, then the path query cache determines whether the path is currently resolving (block 510). This is possible because multiple application threads use the same cache and may request the same paths. Different application threads may use connections between the same source and destination, and this is especially likely in multi-domain paradigm. If the path is not currently resolving, then the path query cache sends the query (block 504) and adds the requesting thread to the requester list (block 505), and operation ends (block 506). If the path is currently resolving in block 510, then the path query cache adds the requesting thread to the requester list (block 505), and operation ends (block 506).

If the cache life timeout has expired in block 508, then the path query cache invalidates and removes the entry (block 511). Then, the path query cache creates a new entry (block 503), sends the path query to the destination address (block 504), and adds the requesting process to the requester list (block 505). Thereafter, operation ends (block 506).

Figure 6:
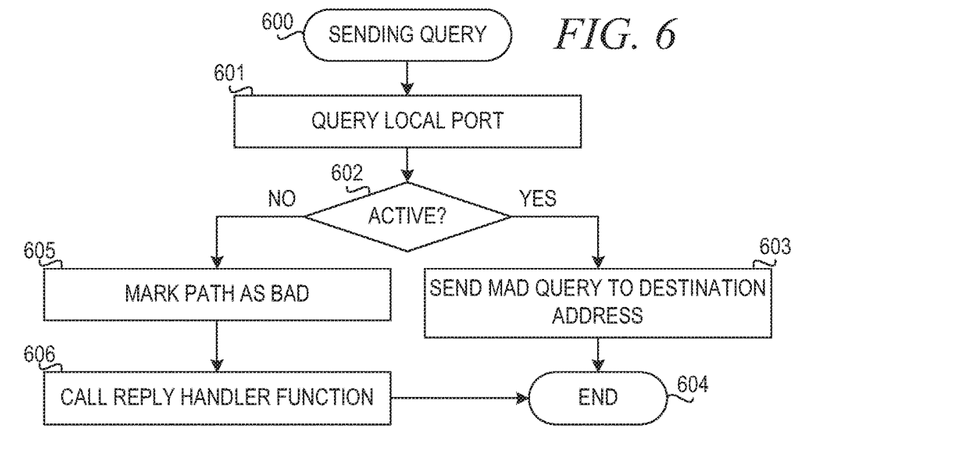
FIG. 6 is a flowchart illustrating operation of a path query cache sending a query to the destination in accordance with an illustrative embodiment.

FIG. 6 is a flowchart illustrating operation of a path query cache sending a query to the destination in accordance with an illustrative embodiment. Operation begins (block 600), and the path query cache queries the local port (i.e., the source port) (block 601) and determines whether the local port is active (block 602). If the local port is active, the path query cache sends a MAD query to the destination address (block 603), and operation ends (block 604). The query mechanism depends on the type of network used and the type of source address. For Infiniband networks and LID addresses, SMP NodeInfo or SMP GUIDInfo or CM Class PortInfo queries can be used. The reply allows reconstruction of destination GID address. For Ethernet networks and MAC addresses, CM Class PortInfo queries can be made. If IP addresses are used for port addresses, additional resolution of IP address to MAC address must be performed before CM Class PortInfo query can be send.

If the local port is inactive in block 602, the path query cache marks the path as bad (block 605) and calls the reply handler function (block 606). Thereafter, operation ends (block 604).

Figure 7:
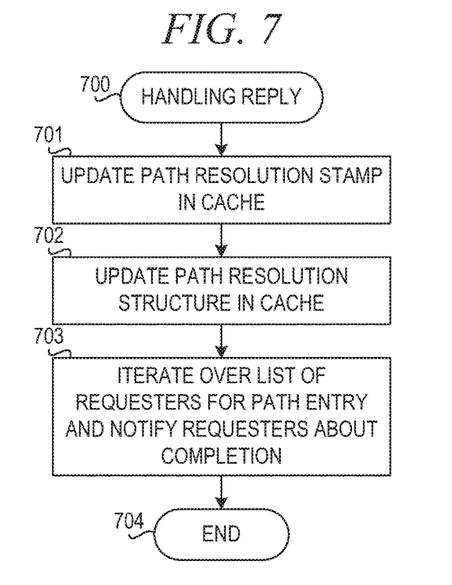
FIG. 7 is a flowchart illustrating operation of the path query cache handling a reply in accordance with an illustrative embodiment.

FIG. 7 is a flowchart illustrating operation of the path query cache handling a reply in accordance with an illustrative embodiment. Operation begins (block 700), and the path query cache updates the path resolution time stamp in the cache (block 701) and updates the path resolution structure in the cache (block 702). The status (available or unavailable) and the source and destination GID addresses are updated. The source GID is taken from the local port as GID that matches the local address.

The path query cache then iterates over the list of requesters for the path entry and notifies the requesters about completion of resolving the path (block 703). Thereafter, operation ends (block 704).

Figure 8:
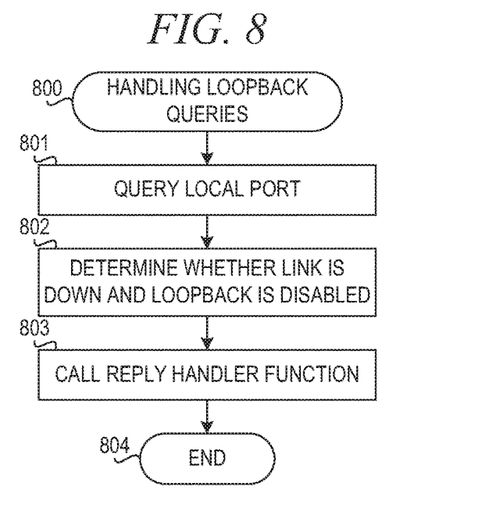
FIG. 8 is a flowchart illustrating operation of the path query cache handling loopback queries in accordance with an illustrative embodiment.

FIG. 8 is a flowchart illustrating operation of the path query cache handling loopback queries in accordance with an illustrative embodiment. Loopback queries can be optimized in place by performing a single request to the local port, i.e., sending the query when the local and destination addresses are the same. Operation begins (block 800), and the path query cache queries the local port (block 801). During the query of the local port, the source GID address is determined as one that matches the specified port address. If source port address was not specified, it is taken as the primary source address.

Additionally, the state of the link can be queried. Some applications may disallow loopback communication in the cases when a local port does not have an active link. This may be because of hardware limitations (loopback not allowed on disabled link) or because of software considerations. The path query cache determines whether loopback is disallowed in the case of a local port not having an active link (block 802). If loopback is disallowed, then operation would then proceed to call of the reply handler function with failure status. The reply handler would provide the path structure and status. If the status is failed, then the path structure content is undefined.

The path query cache then calls the reply handler (block 803). The path query cache calls the reply handler with failure if the link is down and loopback is not allowed, as described above, or based on the results of querying the local port in block 801). Operation of the reply handler function is described above with reference to FIG. 7. Thereafter, operation ends (block 804).

Figure 9:
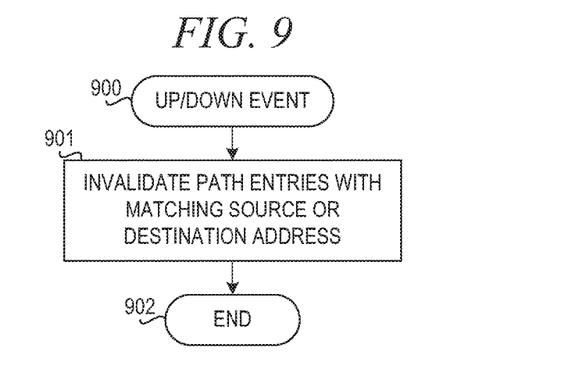
FIG. 9 is a flowchart illustrating operation of the path query cache performing external port monitoring in accordance with an illustrative embodiment.

FIG. 9 is a flowchart illustrating operation of the path query cache performing external port monitoring in accordance with an illustrative embodiment. A local application that opens an Interconnect device context can receive asynchronous events indicating that a port goes up or down. Such events can be terminated locally and can also be sent across the network for other nodes. The Subnet Manager also receives traps (special SMP datagrams) from switches that a switch port goes up or down. The Subnet Manager can also discover that a port goes up or down via periodic monitoring. These Subnet Manager events can be distributed to other nodes. Similar approaches can be used for Ethernet Switches using SNMP or other forms of vendor defined monitoring.

Operation begins when the system receives an event indicating that a port goes up or down (block 900). This can be used as a trigger for disconnect/reconnect before the connection even sees errors. The path query cache invalidates all good or bad path entries having the source or remote address that matches the port that generated the event (block 901). Thereafter, operation ends (block 902). This allows not getting a stale path query result when connection is made due to a link change event.

Figure 10:
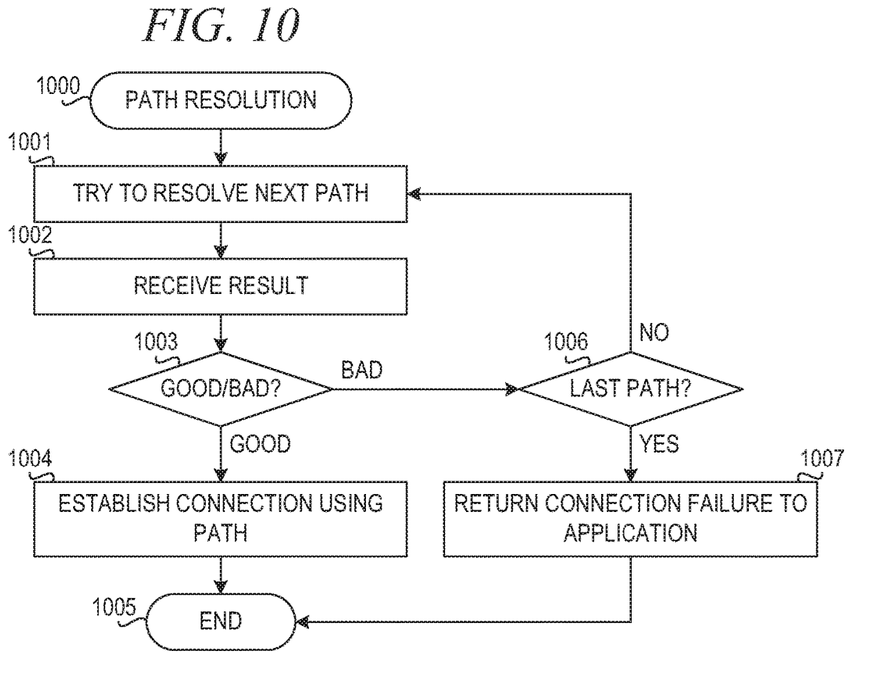
FIG. 10 is a flowchart illustrating operation of a process performing path resolution in accordance with an illustrative embodiment.

FIG. 10 is a flowchart illustrating operation of a process performing path resolution in accordance with an illustrative embodiment. Operation begins (block 1000), and the process attempts to resolve the next (first) path (block 1001). The process receives a result from the path query cache (block 1002) and determines whether the path is marked as good or bad (block 1003). If the path is good, the application establishes a connection with the destination using the path (block 1004). Thereafter, operation ends (block 1005).

If the path is bad in block 1003, then the process determines whether the path is the last path (block 1006). If the path is not the last path, then operation returns to block 1001 to attempt to resolve the next path. If the path is the last path in block 1006, then the process returns a connection failure to the application (block 1007), and operation ends (block 1005).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in processing system comprising least one processor and at least one memory, the at least one memory comprising instructions that are executed by the at least one processor and configure the at least one processor to implement a path query cache, the method comprising:
    responsive to receiving a path query from a process executing in the data processing system, performing a lookup of the path query in the path query cache, wherein the path query identifies a source port and a destination address, wherein the path query cache stores a plurality of entries, each entry comprising a source port, a destination address, source and destination global identifiers, and a good/bad flag indicating whether a path associated with the entry is available or not available;
    responsive to the path query cache determining the path query matches a valid entry in the plurality of entries, returning a result to the process, wherein the result comprises the source and destination global identifiers and the good/bad flag from the valid entry; and
    responsive to the path query cache determining the path does not match any entry in the plurality of entries, creating a new entry in the path query cache for the path query, sending the path query to the destination address, and adding an identifier of the process to a requester list in the new entry.

2. The method of claim 1, further comprising, responsive to receiving a subsequent path query from a second process executing in the data processing system, performing a lookup of the subsequent path query in the path query cache, and responsive to the subsequent path query matching the new entry, adding the second process to the requester list.

3. The method of claim 1, wherein sending the path query to the destination address comprises querying the source port and responsive to the source port being active, sending a management datagram to the destination address.

4. The method of claim 3, further comprising responsive to the source port being inactive, marking the path as bad in the valid entry.

5. The method of claim 1, further comprising:
    responsive to receiving a reply from the destination address for the path query, updating a path resolution time stamp for the path query in the path query cache, updating a path resolution structure fur the path query in the path query cache, and notifying processes in the requester list about completion of the path query.

6. The method of claim 1, wherein responsive to the path query being a loopback query, sending the path query to the destination address comprises querying a local port corresponding to the destination address, updating a path resolution time stamp for the path query in the path query cache, updating a path resolution structure for the path query in the path query cache, and notifying processes in the requester list about completion of the path query.

7. The method of claim 6, further comprising responsive to loopback being disallowed, calling a reply handler function with path unavailable status.

8. The method of claim 1, wherein each entry in the plurality of entries further comprises a path resolution time stamp, the method further comprising:
    responsive to the path query cache determining the path query matches a given entry in the plurality of entries, determining whether a cache life timeout of the given entry has expired based on the path resolution time stamp; and
    responsive to the cache life timeout of the given entry having expired, removing the given entry from the plurality of entries, creating a new entry for the path query, and sending the path query to the destination address.

9. The method of claim 8, wherein the cache life timeout has a first value if the good/bad flag indicates the path associated with the entry is available and wherein the cache life timeout has a second value if the good/bad flag indicates the path associated with the entry is not available.

10. The method of claim 1, further comprising responsive to receiving an event from external port monitoring that a status of a given port changes, invalidating an entry in the plurality of entries associated with the given port.

11. The method of claim 1, wherein responsive to the result indicating the path is bad, the process attempts to resolve another path.

12. A computer program product comprising a computer readable storage medium having a computer readable program stored therein, wherein the computer readable program, when executed on a computing device, causes the computing device to implement a path query cache, wherein the computer readable program causes the computing device to:
    responsive to receiving a path query from a process executing in the data processing system, perform a lookup of the path quern the path query cache, wherein the path query identifies a source port and a destination address, wherein the path query cache stores a plurality of entries, each entry comprising a source port, a destination address, source and destination global identifiers, and a good/bad flag indicating whether a path associated with the entry is available or not available;
    responsive to the path query cache determining the path query matches a valid entry in the plurality of entries, return a result to the process, wherein the result comprises the source and destination global identifiers and the good/bad flag from the valid entry; and
    responsive to the path query cache determining the path does not match any entry in the plurality of entries, create a new entry in the path query cache for the path query, send the path query to the destination address, and add an identifier of the process to a requester list in the new entry.

13. The computer program product of claim 12, wherein responsive to receiving a subsequent path query from a second process executing in the data processing system, the computer readable program further causes the computing device to perform a lookup of the subsequent path query in the path query cache, and responsive to the subsequent path query matching the new entry, add the second process to the requester list.

14. The computer program product of claim 12, wherein sending the path query to the destination address comprises querying the source port and responsive to the source port being active, sending a management datagram to the destination address.

15. The computer program product of claim 12, wherein the computer readable program further causes the computing device to:
    responsive to receiving a reply from the destination address for the path query, update a path resolution time stamp for the path query in the path query cache, update a path resolution structure for the path query in the path query cache, and notify processes in the requester list about completion of the path query.

16. The computer program product of claim 12, wherein responsive to the path query being a loopback query, sending the path query to the destination address comprises querying a local port corresponding to the destination address, updating a path resolution time stamp for the path query in the path query cache, updating a path resolution structure for the path query in the path query cache, and notifying processes in the requester list about completion of the path query.

17. The computer program product of claim 12, wherein each entry in the plurality of entries further comprises a path resolution time stamp, wherein the computer readable program further causes the computing device to:
    responsive to the path query cache determining the path query matches a given entry in the plurality of entries, determine whether a cache life timeout of the given entry has expired based on the path resolution time stamp; and
    responsive to the cache life timeout of the given entry having expired, remove the given entry from the plurality of entries, create a new entry for the path query, and send the path query to the destination address.

18. An apparatus comprising:
at least one processor; and
a memory coupled to the at least one processor, wherein the memory comprises instructions which, when executed by the at least one processor, cause the at least one processor to implement a path query cache, wherein the instructions cause the at least one processor to:
    responsive to receiving a path query from a process executing in the data processing system, perform a lookup of the path query in the path query cache, wherein the path query identifies a source port and a destination address, wherein the path query cache stores a plurality of entries, each entry comprising a source port, a destination address, source and destination global identifiers, and a good/bad flag indicating whether a path associated with the entry is available or not available;
    responsive to the path query cache determining the path query matches a valid entry in the plurality of entries, return a result to the process, wherein the result comprises the source and destination global identifiers and the good/bad flag from the valid entry; and
    responsive to the path query cache determining the path does not match any entry in the plurality of entries, create a new entry in the path query cache for the path query, send the path query to the destination address, and add an identifier of the process to a requester list in the new entry.

19. The apparatus of claim 18, wherein responsive to the path query being a loop back query, sending the path query to the destination address comprises querying a local port corresponding to the destination address, updating a path resolution time stamp for the path query in the path query cache, updating a path resolution structure for the path query in the path query cache, and notifying processes in the requester list about completion of the path query.

20. The apparatus of claim 18, wherein each entry in the plurality of entries further comprises a path resolution time stamp, wherein the instructions further cause the processor to:
    responsive to the path query cache determining the path query matches a given entry in the plurality of entries, determine whether a cache life timeout of the given entry has expired based on the path resolution time stamp; and
    responsive to the cache life timeout of the given entry having expired, remove the given entry from the plurality of entries, create a new entry for the path query, and send the path query to the destination address.

* * * * *